US009140913B2

United States Patent
Katou

(10) Patent No.: US 9,140,913 B2
(45) Date of Patent: Sep. 22, 2015

(54) LIQUID-CRYSTAL PROJECTOR

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 67 days.

(21) Appl. No.: 14/232,859

(22) PCT Filed: Jul. 28, 2011

(86) PCT No.: PCT/JP2011/067325
§ 371 (c)(1),
(2), (4) Date: Jan. 14, 2014

(87) PCT Pub. No.: WO2013/014794
PCT Pub. Date: Jan. 31, 2013

(65) Prior Publication Data
US 2014/0160364 A1   Jun. 12, 2014

(51) Int. Cl.
*G02F 1/1335* (2006.01)
*G02F 1/13* (2006.01)
(Continued)

(52) U.S. Cl.
CPC .......... *G02F 1/1313* (2013.01); *G03B 21/006* (2013.01); *G03B 21/204* (2013.01); *G03B 21/2073* (2013.01); *G03B 33/12* (2013.01); *H04N 9/3164* (2013.01); *H04N 9/3167* (2013.01)

(58) Field of Classification Search
CPC .. G02F 1/1313; H04N 9/3164; H04N 9/3167; H04N 9/3155; G03B 21/006
USPC .......................................................... 349/5
See application file for complete search history.

(56) References Cited

U.S. PATENT DOCUMENTS

| 8,287,132 B2 | 10/2012 | Miyamae et al. |
| 2003/0214633 A1* | 11/2003 | Roddy et al. ............ 353/31 |
| 2011/0043762 A1* | 2/2011 | Miyamae et al. .......... 353/20 |

FOREIGN PATENT DOCUMENTS

| CN | 1459661 A | 12/2003 |
| JP | 3292118 B2 | 6/2002 |

(Continued)

OTHER PUBLICATIONS

Japanese Office Action dated Nov. 18, 2014 with a partial English translation.

(Continued)

*Primary Examiner* — Nathanael R Briggs
(74) *Attorney, Agent, or Firm* — McGinn IP Law Group, PLLC

(57) ABSTRACT

A liquid-crystal projector includes: liquid-crystal panel sections a first illumination section including a red light source, red light emitted from the red light source being applied to a liquid-crystal panel section; a second illumination section including a green light source, a blue light source and a polarizing beam splitter that splits green light emitted from the green light source into p-polarized light and s-polarized light, the green s-polarized light being applied to a liquid-crystal panel section, the green p-polarized light and blue light being applied to a liquid-crystal panel section on the same optical path; a cross dichroic mirror that combines images displayed on liquid-crystal panel sections; a projection lens that projects the combined image; and a control unit that controls on/off states of the red light source, the green light source and the blue light source based on an input video signal to display respective images on the liquid-crystal panel sections.

8 Claims, 11 Drawing Sheets

(51) Int. Cl.
  *G03B 21/00* (2006.01)
  *G03B 21/20* (2006.01)
  *G03B 33/12* (2006.01)
  *H04N 9/31* (2006.01)

(56) References Cited

FOREIGN PATENT DOCUMENTS

| JP | 2004-325477 A | 11/2004 |
| JP | 2005-189472 A | 7/2005 |
| JP | 2010-160444 A | 7/2010 |
| JP | 2011-043597 A | 3/2011 |
| WO | WO 2010/070917 A1 | 6/2010 |
| WO | WO2011/037014 A1 | 3/2011 |

OTHER PUBLICATIONS

Chinese Office Action dated Feb. 12, 2015 with an English Translation.

* cited by examiner

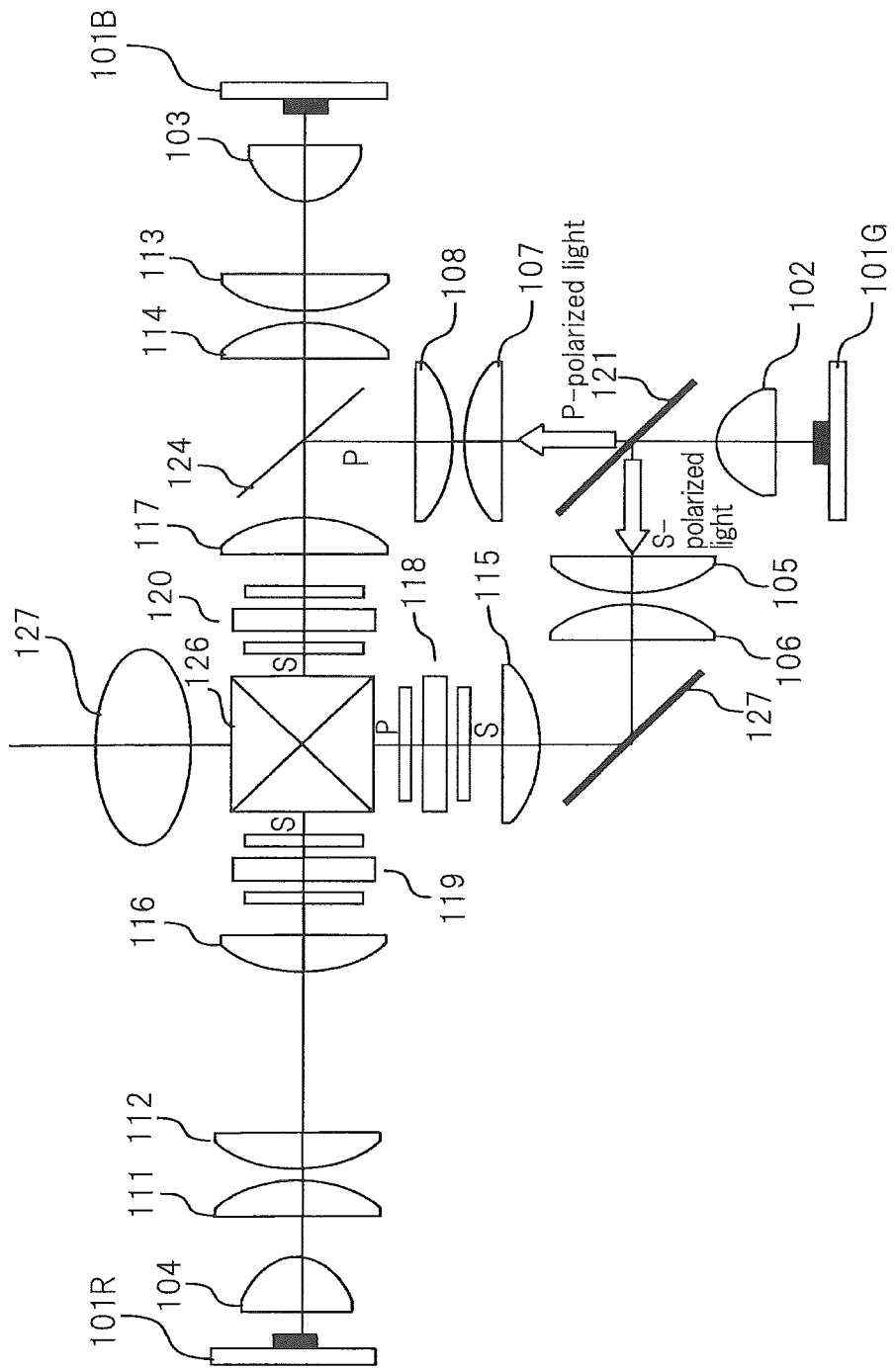

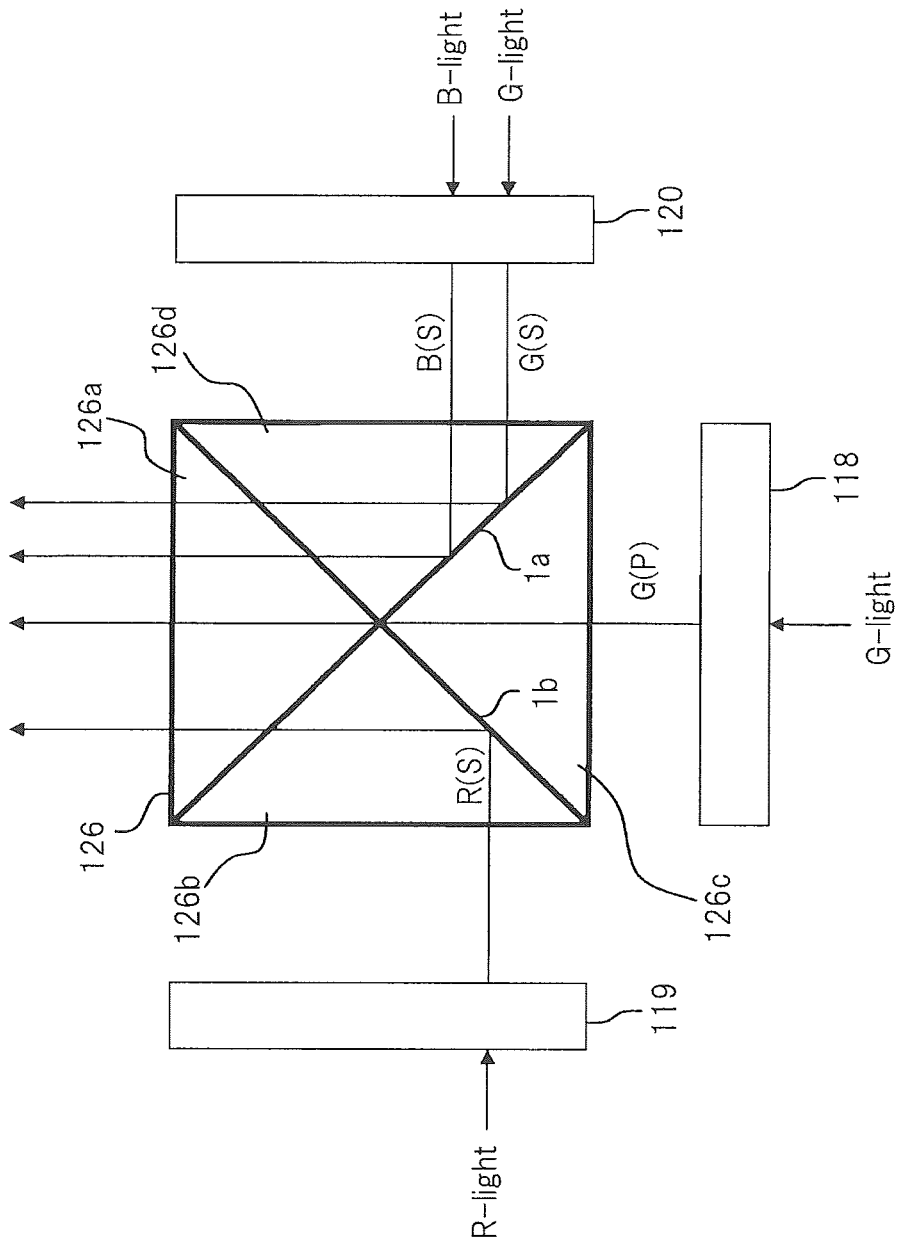

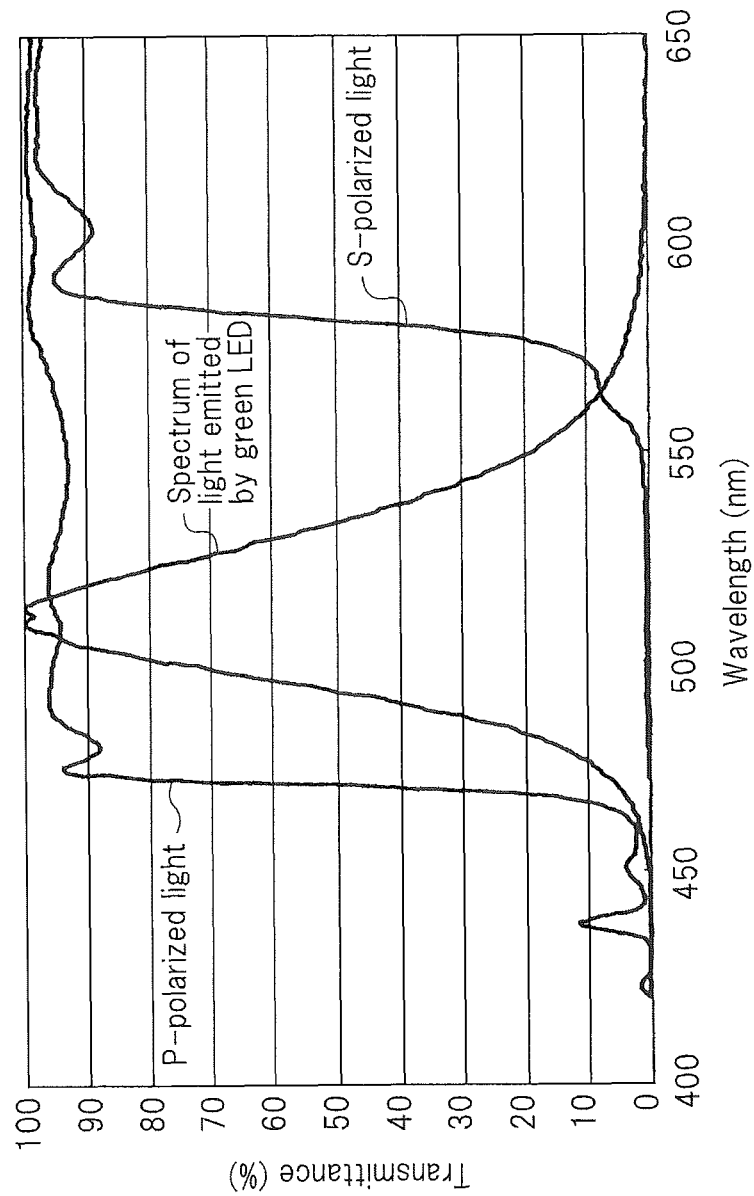

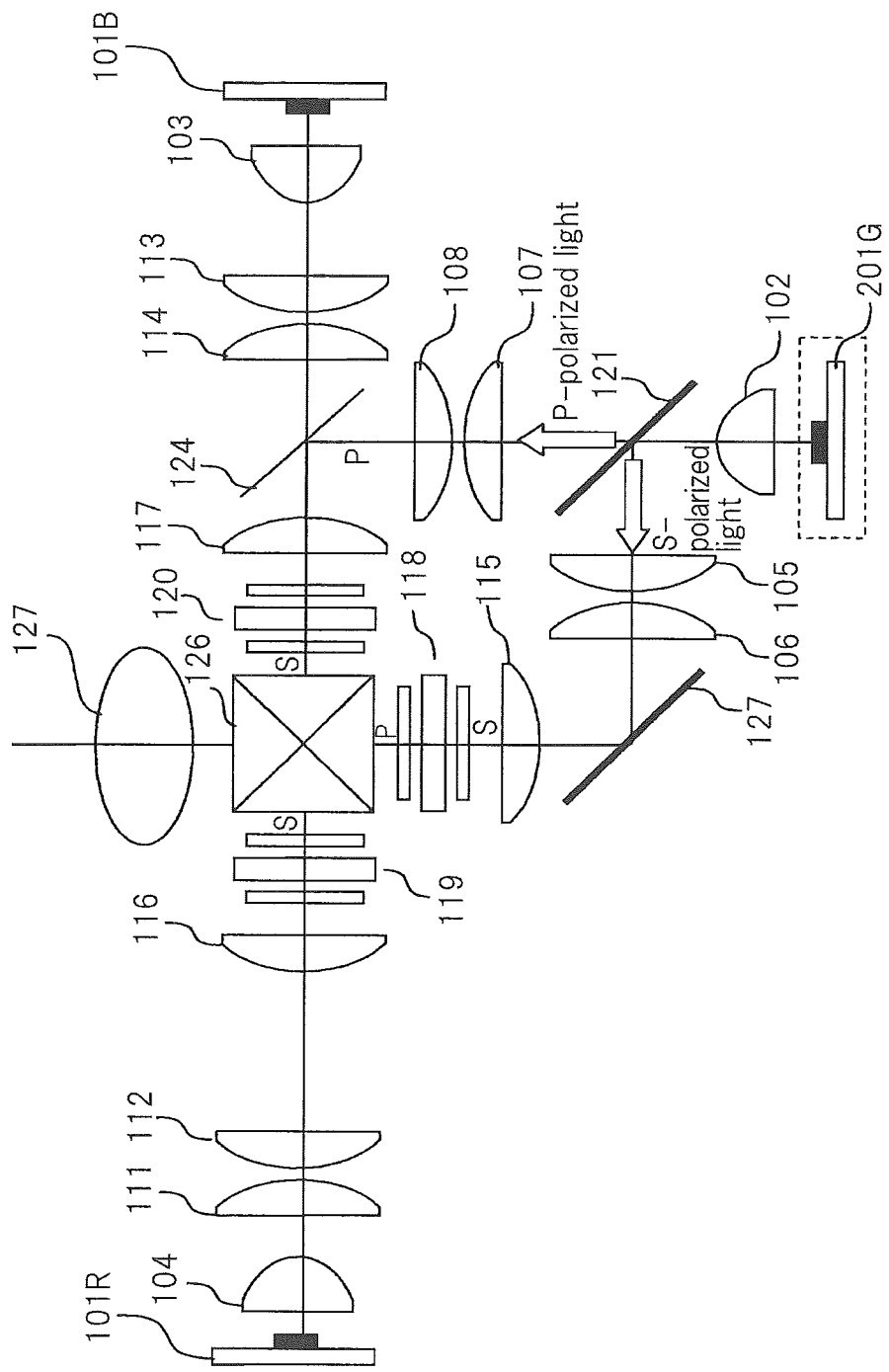

302 Phosphor wheel 301
303
302

LIQUID-CRYSTAL PROJECTOR

TECHNICAL FIELD

The present invention relates to a liquid-crystal projector, and specifically relates to a three panel-type liquid-crystal projector including solid state light sources such as LEDs (light emitting devices).

BACKGROUND ART

Since solid state light sources such as LEDs have advantages of, e.g., good purity of color of emitted light, compact size and excellent lifetime characteristic compared to high-pressure mercury lamps; recently, three panel-type projectors including solid state light sources have been provided.

For example, three panel-type liquid-crystal projectors including three light sources, a red LED, a green LED and a blue LED, have been known.

In such three panel-type liquid-crystal projectors, red light emitted from the red LED is applied to a liquid-crystal panel section for red, green light emitted from the green LED is applied to a liquid-crystal panel section for green, and blue light emitted from the blue LED is applied to a liquid-crystal panel section for blue. Then, the red light, the green light and the blue light that have passed through the respective liquid-crystal panel sections are combined by a color combining section, and the light of the respective colors combined by the color combining section is projected onto a screen via a projection lens.

Although LEDs have been enhanced in performance year after year, the luminous flux of light emitted from such LEDs is still small compared to that of discharge lamps, and thus, brightness of an image projected by a projector using LEDs is not sufficient. Here, a luminous flux represents brightness of the entire light radiated from a light source in a certain direction, and the unit of the luminous flux is lumen (lm). A large luminous flux is synonymous with a large amount of light.

As a first approach for obtaining a bright projection image, there is the method of increasing luminous fluxes of light emitted from light sources. More specifically, use of LEDs with a large light emission area or LEDs arranged in an array enables provision of light sources with a large luminous flux.

However, the above first approach has the following problem.

In general, the amount of light from a light source that can be used as projection light in a projector is determined by the relationship between the light source-side etendue defined by the product of the light emission area of the light source and the divergence angle and the image formation-side etendue defined by the product of the area of a liquid-crystal panel and the acceptance angle (solid angle) determined by the F number of a projection lens. In other words, in a projector, unless the value of the light source-side etendue is smaller than the value of the image formation-side etendue, light from the light source cannot efficiently be used as projection light.

Accordingly, even where the luminous flux of light emitted from a light source is increased by arranging LEDs in an array or using a LED with a large light emission area, the brightness of a projection image cannot be enhanced if the value of the light source-side etendue is larger than the value of the image formation-side etendue. Because of such etendue restriction, a projection image with sufficient brightness cannot be provided by merely increasing the luminous flux of light emitted from a light source under the current circumstances.

As a second approach for obtaining a bright projection image, there is the method of increasing the utilitization efficiency of light emitted from a light source. The method will briefly be described below.

In general, in a liquid-crystal projector, a liquid-crystal panel section includes a liquid-crystal panel and two polarizing plates arranged respectively on the incident surface side and the exit surface side of the liquid-crystal panel. In the liquid-crystal panel section, light that has passed through the incident surface-side polarizing plate becomes linearly-polarized light and the linearly-polarized light is entered onto the liquid-crystal panel. While the incident linearly-polarized light is propagating through the liquid-crystal layer of the liquid-crystal panel in the thickness direction of the liquid-crystal panel, the polarization state of the linearly-polarized light varies according to the refractive index anisotropy (birefringence) of the crystal. The exit surface-side polarizing plate transmits, of output light that has passed through the liquid-crystal layer, only polarized light in a particular direction.

In the above liquid-crystal panel section, only one type of polarized light (s-polarized light or p-polarized light) in the incident light is used and the other type of polarized light is absorbed or reflected and thus does not contribute to formation of an image. Thus, if incident light is non-polarized light, a light loss of approximately 50% will occur in the liquid-crystal panel section.

In the above three panel-type liquid-crystal projector, light of each of the colors emitted from the red LED, the green LED and the blue LED is non-polarized light, and thus, if the light emitted from each LED is entered onto the liquid-crystal panel section without any alteration, a light loss of approximately 50% will occur in the liquid-crystal panel section.

Therefore, the method (second approach), in which a polarization conversion element that includes a first prism and a second prism is provided on an optical path of light of each of the colors emitted from the red LED, the green LED and the blue LED to reduce the loss in the respective liquid-crystal panel sections and to improve light utilitization efficiency, has been considered.

Each of the first prism and the second prism is a cuboidal prism formed by bonding two right angle prisms together.

The first prism includes a polarized light splitting film formed in a surface on which the two right angle prisms are bonded together, the polarized light splitting film transmitting p-polarized light and reflecting s-polarized light, and light emitted from an LED is entered into the polarized light splitting film at an incident angle of approximately 45 degrees. A surface of the first prism that is positioned in a travelling direction of p-polarized light that has passed through the polarized light splitting film is an exit surface, and the p-polarized light is exited from the exit surface.

The second prism includes a reflective film formed in a surface on which the two right angle prisms are bonded together, and s-polarized light reflected by the polarized light splitting film in the first prism is entered into the reflective film at an incident angle of approximately 45 degree. A surface of the second prism that is positioned in a travelling direction of light reflected by the reflective film is an exit surface, and on the exit surface, a retardation plate for converting s-polarized light into p-polarized light is provided.

The p-polarized light that exits from the first prism and the p-polarized light that exits from the second prism travel in a same direction.

However, in the second approach, the area of the exit surface (the first and second exit surfaces) of the polarized light conversion element is approximately twice the light emission area of the LED. Thus, the value of the light source-side etendue is larger than the value of the image formation-side etendue, and as a result, light not used as projection light is increased, resulting in a decrease in light utilitization efficiency. As described above, because of the etendue restriction, even if a polarized light conversion element is used, the light utilitization efficiency cannot be enhanced so much and a projection image with sufficient brightness cannot be provided under the current circumstances.

As a third approach for obtaining a bright projection image, there is the method of increasing the luminous flux of light emitted from a light source without increasing the value of the light source-side etendue (see Patent Literature 1).

A three panel-type projector described in Patent Literature 1 includes a first green LED and a second green LED with different peak wavelengths, and a red LED and a blue LED.

The optical axis of the first green LED is perpendicular to the optical axis of the second green LED, and a dichroic mirror is provided at a position where the optical axes of the first and second green LEDs cross.

A green light beam emitted from the first green LED is reflected by the dichroic mirror, and the reflected light is applied to a liquid-crystal panel for green. A green light beam emitted from the second green LED passes through the dichroic mirror and the passed light is applied to the liquid-crystal panel for green.

A red light beam emitted from the red LED is applied to a liquid-crystal panel for red. A blue light beam emitted from the blue LED is applied to a liquid-crystal panel for blue.

The red image light from the liquid-crystal panel for red, the green image light from the liquid-crystal panel for green and the blue image light from the liquid-crystal panel for blue are combined by a cross dichroic prism. Image light resulting from the combination by the cross dichroic prism is projected onto a screen via a projection lens.

In the above three panel-type projector, the first green light beam emitted from the first green LED and the second green light beam emitted from the second green LED are applied to the liquid-crystal panel for green on the same optical path via the dichroic mirror. According to this configuration, since the value of the light source-side etendue is not increased, most of the first and second green light beams emitted from the first and second green LEDs can be used as projection light. Also, most of the red and blue light beams emitted from the red LED and the blue LED can be used as projection light.

CITATION LIST

Patent Literature

Patent Literature 1: JP2004-325477A

DISCLOSURE OF THE INVENTION

In the first approach, no projection image with sufficient brightness can be provided under the current circumstances because of the etendue restriction. In addition, there is the problem of light loss (approximately 50%) in the liquid-crystal panel section.

In the second approach, although the problem of light loss in the liquid-crystal panel section can be solved by the use of a polarized light conversion element, no projection image with sufficient brightness can be provided under the current circumstances because of the etendue restriction.

In the third approach, although the problem of the etendue restriction can be solved, the problem of light loss in the liquid-crystal panel section still exists, and thus, provision of a projection image with sufficient brightness is still difficult. In addition, two green LEDs are used as a green light source, resulting in an increase in apparatus size and cost.

Furthermore, where solid state light sources such as LEDs are used as light sources for a projector, it is necessary to take the following point into account.

In general, a red LED, a green LED and a blue LED have different output characteristics, and maximum output values of the red LED and the green LED are smaller than that of the blue LED.

When the red LED, the green LED and the blue LED are driven at their respective maximum outputs, the luminance of the projection image becomes highest. However, since a color mixture ratio of light (red, green and blue) from the respective color LEDs driven at the maximum outputs is different from a predetermined color mixture ratio for providing an optimum white balance, the projection image has unnatural colors and the image quality is lowered. Therefore, ordinarily, outputs of the red LED and the blue LED are limited with reference to the maximum output value of the green LED to provide an optimum white balance.

According to the above, in order to provide a bright projection image while maintaining an optimum white balance, it is necessary to increase the luminous flux of light emitted from the green LED.

An object of the present invention is to provide a compact-size liquid-crystal projector with a high light utilitization efficiency, the liquid-crystal projector being able to solve the problem of the etendue restriction, reduce light loss in a liquid-crystal panel section for at least a green light source and increase the luminous flux of emitted light.

In order to achieve the above object, a liquid-crystal projector according to the present invention includes:

first to third liquid-crystal panel sections that each spatially modulate incident light to display an image;

a first illumination section that includes a red light source that emits red light having a peak wavelength in a red wavelength band, the red light emmited from the red light source being applied to the first liquid-crystal panel section;

a second illumination section that includes a green light source that emits green light having a peak wavelength in a green wavelength band and a blue light source that emits blue light having a peak wavelength in a blue wavelength band, the green light emitted from the green light source being split into first linearly-polarized light and second linearly-polarized light, vibration directions of the first linearly-polarized light and the second linearly-polarized light being perpendicular to each other, the first linearly-polarized light being applied to the second liquid-crystal panel section, the second linearly-polarized light and the blue light emitted from the blue light source being applied to the third liquid-crystal panel section;

a polarized light color combining section that combines images displayed on the first to third liquid-crystal panel sections;

a projection lens that projects combined image light resulting from the combination in the polarized light color combining section; and control means that controls on/off states of the red light source, the green light source and the blue light source based on an input video signal to display respective images on the first to third liquid-crystal panel sections.

Another liquid-crystal projector according to the present invention includes:

a red light source that emits red light having a peak wavelength in a red wavelength band;

a green light source that emits green light having a peak wavelength in a green wavelength band;

a blue light source that emits blue light having a peak wavelength in a blue wavelength band;

a first polarizing/splitting section that splits the red light emitted from said red light source into first linearly-polarized light and second linearly-polarized light, vibration directions of the first linearly-polarized light and the second linearly-polarized light being perpendicular to each other;

a second polarizing/splitting section that splits the green light emitted from said green light source into the first linearly-polarized light and the second linearly-polarized light;

a first color combining section that receives the first linearly-polarized light of the red light and the first linearly-polarized light of the green light as incident light, and outputs the incident red light and the incident green light on a same optical path;

a second color combining section that receives the second linearly-polarized light of the green light and the blue light output from said blue light source as incident light, and outputs the incident green light and the incident blue light on a same optical path;

a first liquid-crystal panel section that spatially modulates the second linearly-polarized light of the red light to display an image;

a second liquid-crystal panel section that spatially modulates the red light and the green light that exit from the first color combining section to display an image;

a third liquid-crystal panel section that spatially modulates the green light and the blue light that exit from said second color combining section to display an image;

a polarized light color combining section that combines the images displayed on said first to third liquid-crystal panel sections;

a projection lens that projects combined image light resulting from the combination in said second polarized light color combining section; and control means that controls on/off states of said red light source, said green light source and said blue light source based on an input video signal to display respective images on said first to third liquid-crystal panel sections.

BRIEF DESCRIPTION OF THE DRAWINGS

FIG. 2 is a schematic diagram illustrating a configuration of a cross dichroic mirror in the liquid-crystal projector illustrated in FIG. 1.

FIG. 3 is a diagram illustrating spectral transmission characteristics of a dichroic film in the cross dichroic mirror illustrated in FIG. 2 for p-polarized light and s-polarized light.

FIG. 10 is a schematic diagram illustrating a configuration of a liquid-crystal projector according to another exemplary embodiment.

FIG. 11 is a schematic diagram illustrating a phosphor wheel in a green light source in the liquid-crystal projector illustrated in FIG. 10.

FIG. 12 is a schematic diagram illustrating an overall configuration of the green light source in the liquid-crystal projector illustrated in FIG. 10.

EXPLANATION OF REFERENCE NUMBERS

101B blue light source
101G green light source
101R red light source
121 polarizing beam splitter
118, 119, 120 liquid-crystal panel section
126 cross dichroic prism
127 projection lens

BEST MODE FOR CARRYING OUT THE INVENTION

Next, exemplary embodiments will be described with reference to the drawings.

First Exemplary Embodiment

Figure 1:
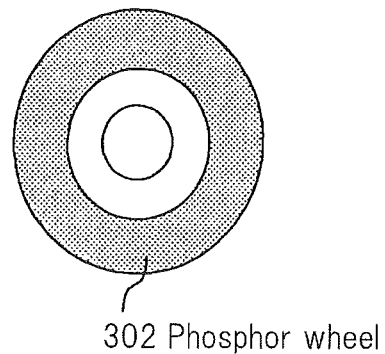
FIG. 1 is a schematic diagram illustrating a configuration of a liquid-crystal projector that is a first exemplary embodiment.
Figure 1:
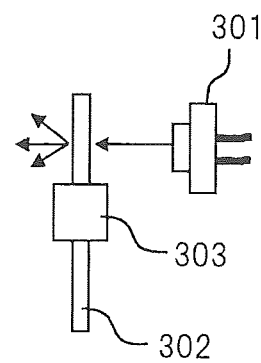

FIG. 1 is a schematic diagram illustrating a configuration of a liquid-crystal projector that is a first exemplary embodiment.

Referring to FIG. 1, the liquid-crystal projector according to the present exemplary embodiment includes three light sources: green light source 101G, red light source 101R and blue light source 101B.

Green light source 101G is a solid state light source whose peak wavelength is set in a green wavelength band, and includes, for example, an LED or a semiconductor laser whose emission color is green. Red light source 101R is a solid state light source whose peak wavelength is set in a red wavelength band, and includes, for example, an LED or a semiconductor laser whose emission color is red. Blue light source 101B is a solid state light source whose peak wavelength is set in a blue wavelength band, and includes, for example, an LED or a semiconductor laser whose emission color is blue.

However, it is known that LEDs or the like have peak wavelengths varying in a range of around ±10 to 20 nm because of manufacturing problems, and within the range of the manufacturing variations, the peak wavelengths are considered as being substantially the same. Also, the respective emission areas of green light source 101G, red light source 101R and blue light source 101B are maximum areas within an area range that meets the etendue restriction.

Lens 102 and polarizing beam splitter 121 are arranged in the travelling direction of green light (non-polarized light) emitted from green light source 101G. The green light from green light source 101G is entered into polarizing beam splitter 121 via lens 102.

Polarizing beam splitter 121 splits the incident light into first linearly-polarized light and second linearly-polarized light that vibrate in respective directions perpendicular to each other. Here, it is assumed that the first linearly-polarized light is s-polarized light and the second linearly-polarized light is p-polarized light, and polarizing beam splitter 121 has the polarized light splitting characteristic of reflecting s-polarized light and transmitting p-polarized light.

Lenses 105 and 106 and reflective mirror 127 are arranged in the travelling direction of green s-polarized light reflected by polarizing beam splitter 121. The green s-polarized light from polarizing beam splitter 121 passes through lenses 105 and 106 sequentially and is then reflected by reflective mirror 127 at an angle of approximately 90°.

Reflective mirror 127 may be a mirror having any reflection characteristic as long as such mirror can reflect green light. For example, reflective mirror 127 may be an aluminum-deposited mirror or a dichroic mirror including a dielectric multi-layer film that reflects green light and transmits or absorbs light of colors other than green.

Lens 115 and liquid-crystal panel section 118 are arranged in the travelling direction of green s-polarized light from reflective mirror 127. The green s-polarized light from reflective mirror 127 is entered into liquid-crystal panel section 118 via lens 115.

Liquid-crystal panel section 118 includes a liquid-crystal panel sandwiched by two polarizing plates. In liquid-crystal panel section 118, light that has passed through the incident surface-side polarizing plate becomes linearly-polarized light and the linearly-polarized light is entered into the liquid-crystal panel. The polarization state of the incident linearly-polarized light varies according to the refractive index anisotropy (birefringence) of the crystal while propagating through a liquid-crystal layer of the liquid-crystal panel in a thickness direction of the liquid-crystal panel. The exit surface-side polarizer transmits, of output light that has passed though the liquid-crystal layer, only polarized light in a particular direction. Here, since green s-polarized light is applied to liquid-crystal panel section 118, green p-polarized light is exited from liquid-crystal panel section 118.

Lenses 103, 113 and 114, dichroic mirror 124, lens 117 and liquid-crystal panel section 120 are arranged in the travelling direction of blue light (non-polarized light) emitted from blue light source 101B.

Blue light emitted from blue light source 101B passes through lenses 103, 113 and 114 sequentially and is then entered into dichroic mirror 124.

Dichroic mirror 124 is arranged at a position where an optical path of blue light from blue light source 101B and an optical path of green p-polarized light that has passed through polarizing beam splitter 121 cross (or cross at right angles). Dichroic mirror 124 has the characteristic of reflecting green light and transmitting blue light.

Blue light from blue light source 101B passes through dichroic mirror 124, and green p-polarized light from polarizing beam splitter 121 is reflected by dichroic mirror 124 at an angle of approximately 90°. The blue light that has passed though dichroic mirror 124 and green p-polarized light that has been reflected by dichroic mirror 124 are applied to liquid-crystal panel section 120 via lens 117 on the same optical path.

Liquid-crystal panel section 120 has a structure in which a liquid-crystal panel is sandwiched by two polarizers as with liquid-crystal panel section 118, but is configured to output s-polarized light. More specifically, if blue light (non-polarized light) from blue light source 101B is applied to liquid-crystal panel section 120, blue s-polarized light will be exited from liquid-crystal panel section 120. If green p-polarized light from green light source 101G is applied to liquid-crystal panel section 120, green s-polarized light will be exited from liquid-crystal panel section 120.

Lenses 111, 112 and 116 and liquid-crystal panel section 119 are arranged in the travelling direction of red light (non-polarized light) emitted from red light source 101R.

Red light emitted from red light source 101R passes through lenses 111, 112 and 116 sequentially and is then applied to liquid-crystal panel section 119.

Liquid-crystal panel section 119 has a structure in which a liquid-crystal panel is sandwiched by two polarizers as with liquid-crystal panel section 118, but is configured to output s-polarized light. Here, since red light (non-polarized light) from red light source 101R is applied to liquid-crystal panel section 119, s-polarized light is exited from liquid-crystal panel section 119.

Liquid-crystal panel section 119 is arranged so as to face liquid-crystal panel section 120. An optical path of green p-polarized light that exits from liquid-crystal panel section 118 crosses (or crosses at right angles) both the optical path of red s-polarized light that exits from liquid-crystal panel section 119 and the optical path of blue or green s-polarized light that exits from liquid-crystal panel section 120 at one point, and cross dichroic mirror 126 is arranged at the cross point.

FIG. 2 illustrates an example of cross dichroic mirror 126.

As illustrated in FIG. 2, cross dichroic mirror 126 includes four right angle prisms 126a to 126d each including surfaces that form a right angle, the surfaces of prisms 126a to 126d being bonded to one another.

The bonded surfaces of right angle prisms 126a and 126b and the bonded surfaces of right angle prisms 126c and 126d form an even first flat surface, and dichroic film 1a is formed in the first flat surface.

The bonded surfaces of right angle prisms 126a and 126d and the bonded surfaces of right angle prisms 126b and 126c form an even second flat surface that crosses (or crosses at right angles) the first flat surface, and dichroic film 1b is formed in the second flat surface.

In cross dichroic mirror 126, both green image light (p-polarized light) from liquid-crystal panel section 118 and red image light (s-polarized light) from liquid-crystal panel section 119 are entered into one surface of dichroic film 1a at an incident angle of approximately 45 degrees, and blue or green image light (s-polarized light) from liquid-crystal panel section 120 is entered into another surface of dichroic film 1a at an incident angle of approximately 45 degrees.

FIG. 3 illustrates spectral transmission characteristics of dichroic film 1a for p-polarized light and s-polarized light. In FIG. 3, the ordinate axis represents transmittance (%) and the abscissa axis represents wavelength (nm). In FIG. 3, the spectrum indicated in the center is a spectrum of light emitted from green light source 101G.

The cut-off wavelength is defined as the wavelength at which the transmittance is 50%. The cut-off wavelength of dichroic film 1a with respect to incident p-polarized light is set so as to reflect light with wavelengths equal to or shorter than the blue wavelength range and transmit light in the other wavelength ranges (including the green and red wavelength ranges).

Also, the cut-off wavelength of dichroic film 1a with respect to incident s-polarized light is set so as to transmit light with wavelengths equal to or longer than the red wavelength range and reflect light in the other wavelength ranges (including the green and blue wavelength ranges).

According to the characteristics illustrated in FIG. 3, dichroic film 1a transmits both green image light (p-polarized light) from liquid-crystal panel section 118 and red image light (s-polarized light) from liquid-crystal panel section 119, and reflects blue or green image light (s-polarized light) from liquid-crystal panel section 120.

Also, in cross dichroic mirror 126, both green image light (p-polarized light) from liquid-crystal panel section 118 and blue or green image light (s-polarized light) from liquid-crystal panel section 120 are entered into the one surface of dichroic film 1b at an incident angle of approximately 45 degrees, and red image light (s-polarized light) from liquid-crystal panel section 119 is entered into the other surface of dichroic film 1b at an incident angle of approximately 45 degrees.

Figure 4:
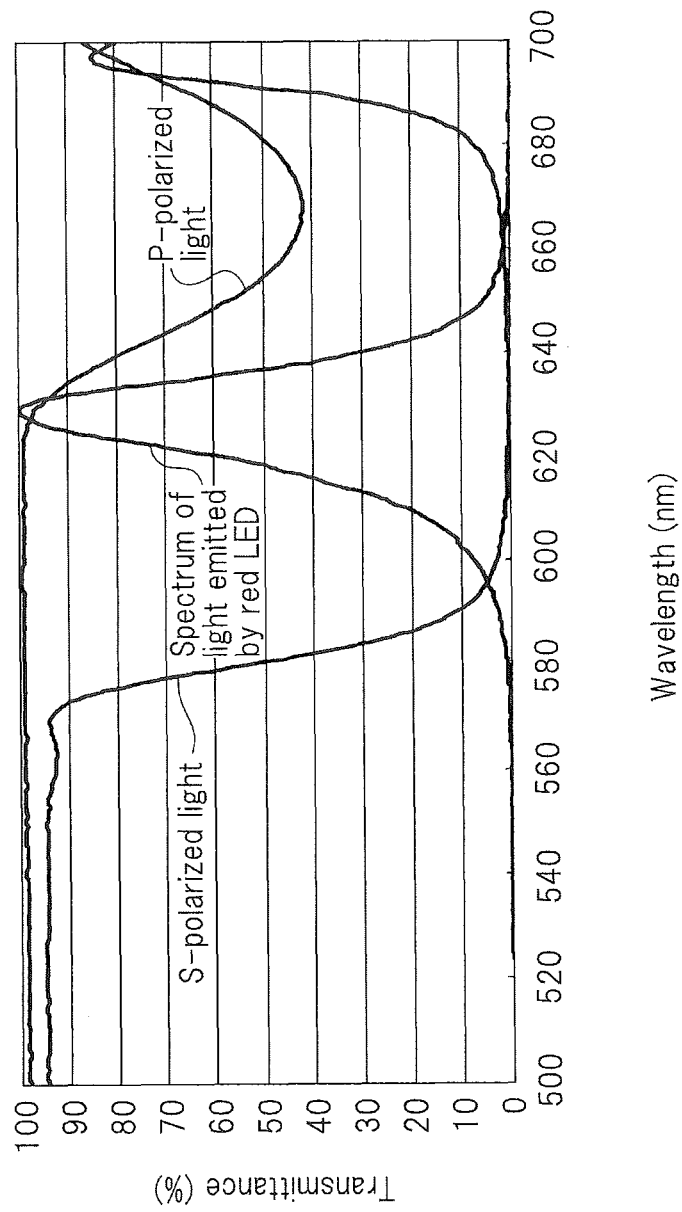
FIG. 4 is a diagram illustrating spectral transmission characteristics of another dichroic film in the cross dichroic mirror illustrated in FIG. 2 for p-polarized light and s-polarized light.

FIG. 4 illustrates spectral transmission characteristics of dichroic film 1b for p-polarized light and s-polarized light. In FIG. 4, the ordinate axis represents transmittance (%) and the abscissa axis represents wavelength (nm). The spectrum illustrated in FIG. 4 is a spectrum of light emitted by red light source 101R.

The cut-off wavelength of dichroic film 1b with respect to incident p-polarized light is set so as to reflect light in the red wavelength range and transmit light in wavelength ranges (green and blue) other than the red wavelength range. Dichroic film 1b transmits p-polarized light in an infrared wavelength range.

The cut-off wavelength of dichroic film 1b with respect to incident s-polarized light is set so as to transmit light with wavelengths equal to or shorter than the green wavelength range and reflect light in the other wavelength ranges (including the red wavelength ranges).

According to the characteristics illustrated in FIG. 4, dichroic film 1b transmits both green image light (p-polarized light) from liquid-crystal panel section 118 and blue or green image light (s-polarized light) from liquid-crystal panel section 120, and reflects red image light (s-polarized light) from liquid-crystal panel section 119.

Dichroic film 1a having the spectral transmission characteristics illustrated in FIG. 3 and dichroic film 1b having the spectral transmission characteristics illustrated in FIG. 4 each can be formed by a dielectric multi-layer film. In this case, the cut-off wavelength settings can be adjusted by, e.g., the material, the stacked layer count, the film thickness and the refractive index of the dielectric multi-layer film.

In the cross dichroic prism 126 illustrated in FIG. 2, a slant surface of right angle prism 126a is an exit surface. Red image light (s-polarized light) from liquid-crystal panel section 119 is reflected by dichroic film 1b and the reflected image light is exited from the exit surface. Green image light (p-polarized light) from liquid-crystal panel section 118 passes through dichroic films 1a and 1b and the transmitted image light is exited from the exit surface. Green or blue image light (s-polarized light) from liquid-crystal panel section 120 is reflected by dichroic film 1a and the reflected image light is exited from the exit surface. Consequently, image light resulting from the red image light, the blue image light and the green image light being combined is exited from the exit surface of the cross dichroic prism 126.

Projection lens 127 illustrated in FIG. 1 is arranged at a position facing the exit surface of cross dichroic prism 126. Projection lens 127 projects image light that exits from the exit surface of cross dichroic prism 126 onto an external screen. The external screen may be a dedicated screen or a structure such as a wall.

A first illumination section that applies red light to liquid-crystal panel section 119 includes red light source 101R and lenses 104, 111, 112 and 116, and a configuration of the first illumination section is not limited to the configuration illustrated in FIG. 1. For example, the number of lenses is not limited to four and may be another number. Furthermore, an optical component for providing a uniform illuminance distribution such as a rod integrator or a fly's eye integrator may be provided on the optical path of red light emitted from red light source 101R.

A second illumination section that applies green light to liquid-crystal panel sections 118 and 120 and that applies blue light to liquid-crystal panel section 120 includes green light source 101G, blue light source 101B, and lenses 102, 103, 105, 106, 107, 108, 113, 114, 115 and 117. A configuration of the second illumination section is also not limited to the configuration illustrated in FIG. 1. The number of lenses can be arbitrarily changed. On the optical path of each of green light source 101G and blue light source 101B, an optical component may be provided in order to ensure uniform illuminance distribution such as mentioned above.

Next, a configuration of a control system of a liquid-crystal projector according to the present exemplary embodiment will be described.

Figure 5:
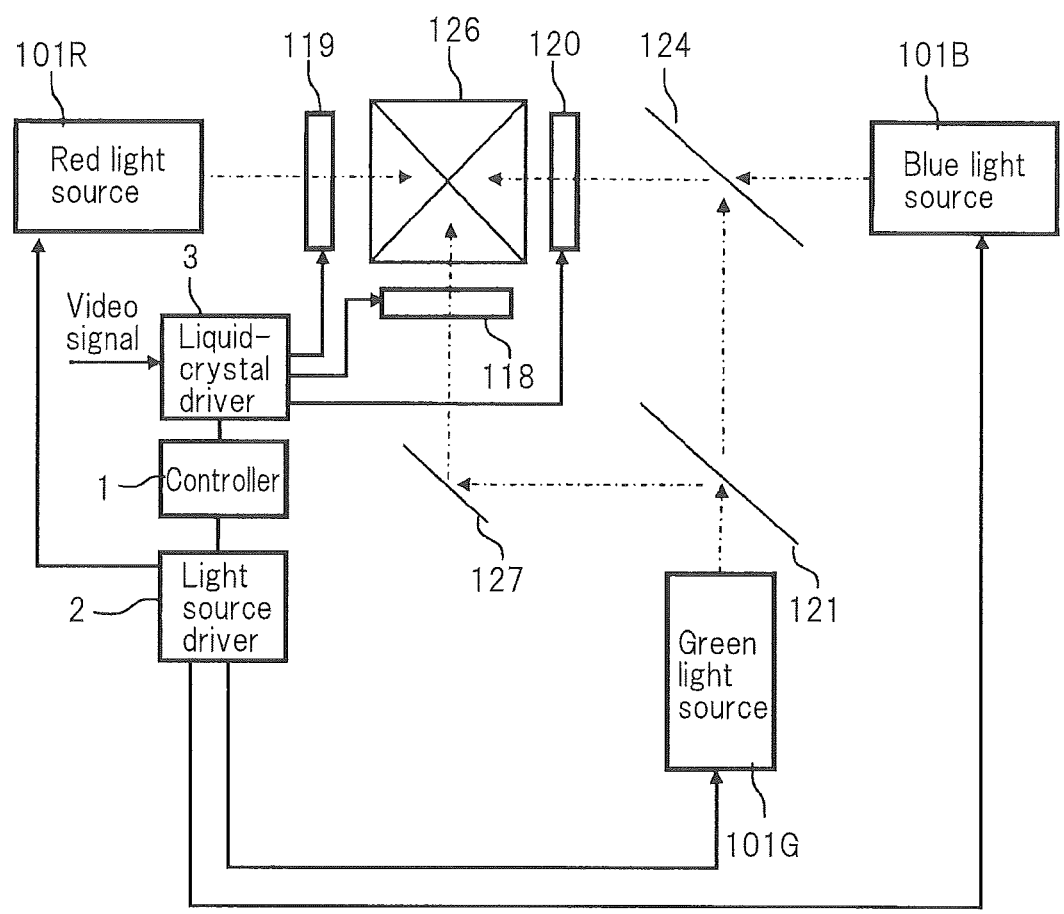
FIG. 5 is a block diagram illustrating a configuration of a control system in the liquid-crystal projector illustrated in FIG. 1.

FIG. 5 illustrates a configuration of the control system. In FIG. 5, a conceptual block diagram with a lens system omitted is indicated for ease of description.

Referring to FIG. 5, the control system includes controller 1, light source driver 201 and liquid-crystal driver 203.

Controller 1 supplies drive timing signals for driving liquid-crystal panel sections 118 to 120, respectively, to liquid-crystal driver 3. Controller 1 supplies lighting timing signals for driving blue light source 101B, green light source 101G and red light source 101R, respectively, to light source driver 2.

Light source driver 2 individually controls the lighting states of red light source 101R, green light source 101G and blue light source 101B according to the lighting timing signals from controller 1.

Liquid-crystal driver 3 individually drives liquid-crystal panel sections 118 to 120 based on a video signal input from an external video image supply apparatus and the drive timing signals from controller 1. The external video image supply apparatus is, for example, an information processing apparatus such as a personal computer.

Figure 6:
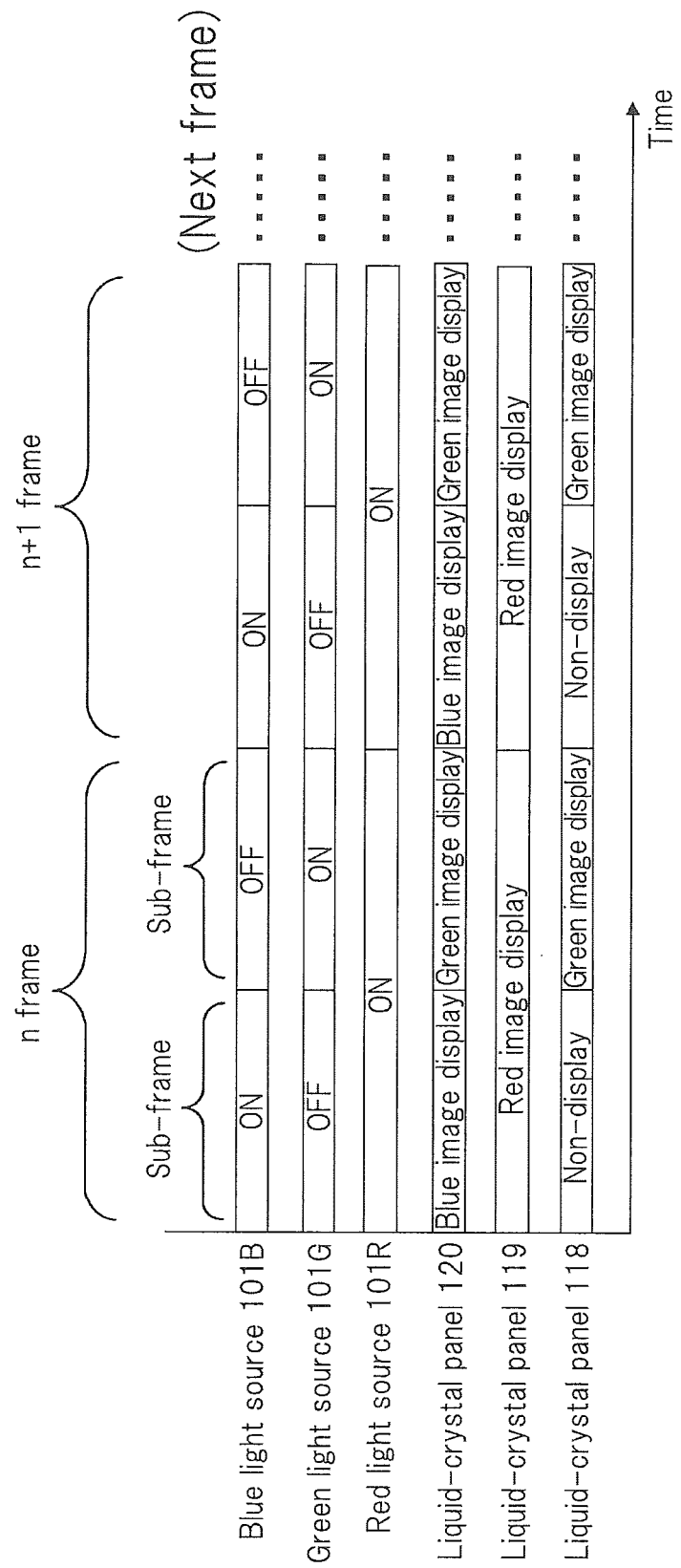
FIG. 6 is a timing chart for describing on/off operation of respective light sources and displaying operation of respective liquid-crystal panel sections in the liquid-crystal projector illustrated in FIG. 1.

FIG. 6 is a timing chart for describing lighting operation of blue light source 101B, green light source 101G and red light source 101R and for displaying operation of liquid-crystal panel sections 118 to 120.

Referring to FIG. 6, one frame includes a first sub-frame and a second sub-frame. In this example, the first sub-frame and the second sub-frame have the same length. For example, the frame frequency is 60 Hz, and the sub-frame frequency is 120 Hz. The ratio between a first sub-frame period and a second sub-frame period in one frame can be arbitrarily set.

In the first sub-frame period in an n frame, light source driver 2 brings blue light source 101B into an on state and brings green light source 101G into an off state, liquid-crystal driver 3 causes an image based on a blue video signal obtained from an input video signal to be displayed on liquid-crystal panel section 120. In this case, liquid-crystal panel section 120 displays a blue image while liquid-crystal panel section 118 is in a non-display state.

In a second sub-frame period in the n frame, light source driver 2 brings blue light source 101B into an off state and brings green light source 101G into an on state, and liquid-crystal driver 3 causes an image based on a green video signal obtained from the input video signal to be displayed on each of liquid-crystal panel sections 118 and 120. In this case, liquid-crystal panel sections 118 and 120 each display a green image.

In the n frame period, light source driver 2 brings red light source 101R into an on state, and liquid-crystal driver 3 causes an image based on a red video signal obtained from the input video signal to be displayed on liquid-crystal panel section 119. In this case, liquid-crystal panel section 119 displays a red image.

In the operation illustrated in FIG. 6, in the first sub-frame period in the n frame, a blue image is displayed on liquid-crystal panel section 120 and a red image is displayed on liquid-crystal panel section 119. In the following second sub-frame period, a red image is displayed on liquid-crystal panel section 119 and a green image is displayed on liquid-crystal panel section 118. Accordingly, because of an integral effect of human eyes, an observer can observe a color image resulting from the blue and green images displayed on the first sub-frame period and the red and green images displayed on the second sub-frame period being combined, in the n frame.

In the liquid-crystal projector according to the present exemplary embodiment, red light from red light source 101R is applied to liquid-crystal panel section 119. Green light from green light source 101G is split into p-polarized light and s-polarized light by polarizing beam splitter 121, and green s-polarized light is applied to liquid-crystal panel section 118. Green p-polarized light is combined with blue light (non-polarized light) from blue light source 101B by dichroic mirror 124, and the combined blue and green light is applied to liquid-crystal panel section 120 on the same optical path.

With the above-described configuration, the value of the light source-side etendue is not increased.

Also, liquid-crystal panel sections 119 and 120 are configured that s-polarized light is exited upon receipt of p-polarized light, and liquid-crystal panel section 118 is configured that p-polarized light is exited upon receipt of s-polarized light. Green s-polarized light from green light source 101G is applied to liquid-crystal panel section 118, and green p-polarized light from green light source 101G is applied to liquid-crystal panel section 120. Accordingly, almost no light loss of green light from green light source 101G occurs in liquid-crystal panel sections 118 and 120.

Meanwhile, red light source 101R and blue light source 101B each emit non-polarized light, and thus, approximately a half amount of red light from red light source 101R and approximately a half amount of blue light from blue light source 101B are absorbed or reflected by liquid-crystal panel sections 119 and 120, respectively.

However, for example, a red LED, a green LED and a blue LED have different output characteristics, and under the current circumstances, the green LED has the smallest maximum output value and the red LEDs has the next smallest maximum output value. Ordinarily, output ranges of the red LED and the blue LED are set with reference to the maximum output value of the green LED, and thus, the red LED and the blue LED each have a certain output margin. Accordingly, if LEDs are used as light sources, outputs of red light source 101R and blue light source 101B are increased, taking light loss in the respective liquid-crystal panels into account, and thus prevent, to a certain extent, a decrease in the amounts of red and blue light.

In addition, human eyes are more sensitive to changes in green luminance than to changes in red and blue luminance, and thus any decrease in light loss in the liquid-crystal panel for green light source 101G more effectively ensures projection of a bright image.

The above-described liquid-crystal projector according to the present exemplary embodiment is an example of the present invention, and the configuration thereof can be arbitrarily changed.

For example, in the light source driving operation and the liquid-crystal panel on/off operation illustrated in FIG. 6, green light source 101G and blue light source 101B can be driven in a time-division manner with twice the normal current. The amounts of light from green light source 101G and blue light source 101B in this case are substantially the same as the amounts of light from green light source 101G and blue light source 101B where green light source 101G and blue light source 101B are continuously in the on state over one frame period, respectively.

Furthermore, as with red light source 101R, green light source 101G and blue light source 101B may be in the on state over one frame period. In this case, liquid-crystal panel section 120 displays an image of blue light and green light as an image based on a blue video signal in the one frame period.

According to the above configuration, green light source 101G and blue light source 101B can be in the on state continuously, thereby ensuring the projection of a brighter image as compared with the image in the operation illustrated in FIG. 6.

Also, in the present exemplary embodiment, for green light source 101G, light loss in the liquid-crystal panel is reduced without using a polarized light conversion element to achieve an increase in brightness of the projection image and a reduction in costs.

In addition, compared to a mode in which a plurality of light sources is used as a green light source, only one green light source 101G is provided and the costs and the size can be reduced in proportion to the reduced number of light sources.

Second Exemplary Embodiment

Figure 7:
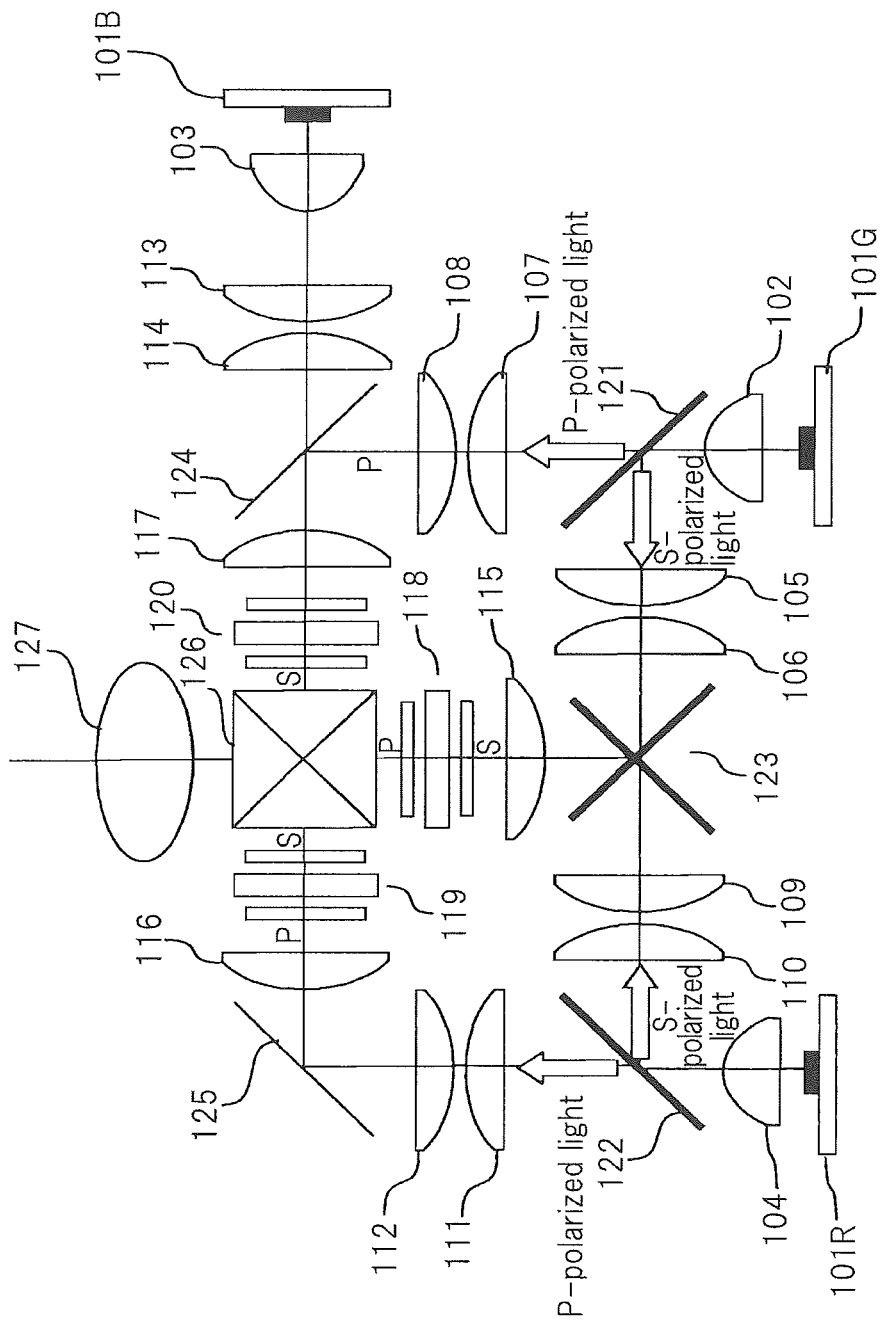
FIG. 7 is a schematic diagram illustrating a configuration of a liquid-crystal projector that is a second exemplary embodiment.

FIG. 7 is a schematic diagram illustrating a configuration of a liquid-crystal projector that is a second exemplary embodiment.

The liquid-crystal projector illustrated in FIG. 7 has a configuration that is the same as that of the first exemplary embodiment except for the addition of polarizing beam splitter 122, reflective mirror 125 and lenses 109 and 110 and provision of cross dichroic mirror 123 instead of reflective mirror 127. In FIG. 7, components that are the same as those of the first exemplary embodiment are provided with reference numerals that are the same as those of the first exemplary embodiment, and a detailed description thereof will be omitted here.

Lens 104 and polarizing beam splitter 122 are arranged in the travelling direction of red light from red light source 101R. Red light from red light source 101R enters polarizing beam splitter 122 via lens 104.

Polarizing beam splitter 122 splits incident light into first linearly-polarized light and second linearly-polarized light that vibrate in respective directions perpendicular to each other. Here, it is assumed that the first linearly-polarized light is s-polarized light and the second linearly-polarized light is p-polarized light, and polarizing beam splitter 122 has the polarized light splitting characteristic of reflecting s-polarized light and transmitting p-polarized light.

Lenses 110 and 109, and cross dichroic mirror 123 are arranged in the travelling direction of red s-polarized light reflected by polarizing beam splitter 122. Polarizing beam splitters 121 and 122 are provided in such a manner that the central ray of green s-polarized light reflected by polarizing beam splitter 121 corresponds to the central ray of red s-polarized light reflected by polarizing beam splitter 122.

Figure 8:
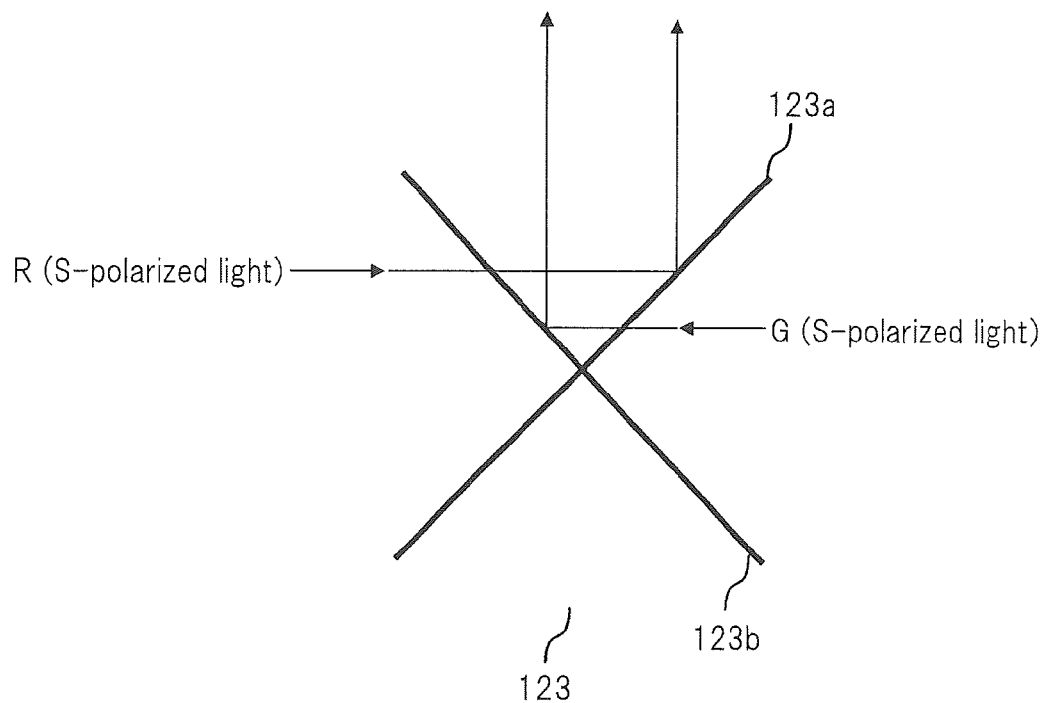
FIG. 8 is a schematic diagram illustrating a configuration of a cross dichroic mirror in the liquid-crystal projector illustrated in FIG. 7.

As illustrated in FIG. 8, cross dichroic mirror 123 includes dichroic films 123a and 123b that cross (or cross at right angles) each other.

Dichroic film 123a has the characteristic of reflecting red s-polarized light and transmitting green s-polarized light. Meanwhile, dichroic film 123b has the characteristic of transmitting red s-polarized light and reflecting green s-polarized light.

Red s-polarized light reflected by polarizing beam splitter 122 is entered into cross dichroic mirror 123 via lenses 110 and 109. Green s-polarized light reflected by polarizing beam splitter 121 is entered into cross dichroic mirror 123 via lenses 105 and 106.

In cross dichroic mirror 123, the red s-polarized light from polarizing beam splitter 122 is reflected by dichroic film 123a and the green s-polarized light from polarizing beam splitter 121 is reflected by dichroic film 123b. The red s-polarized light reflected by dichroic film 123a and the green s-polarized light reflected by dichroic film 123b are applied to liquid-crystal panel section 118 via lens 115 on the same optical path.

Lenses 111 and 112, and reflective mirror 125 are arranged in the travelling direction of the red p-polarized light that has passed through polarizing beam splitter 122. The red p-polarized light that has passed through polarizing beam splitter 122 passes through lenses 111 and 112 sequentially, and is reflected by reflective mirror 125 at an angle of approximately 90°.

The red p-polarized light reflected by reflective mirror 125 is applied to liquid-crystal panel section 119 via lens 116. Reflective mirror 125 may be a mirror having any reflection characteristics as long as such mirror can reflect red light. For example, reflective mirror 125 may be an aluminum-deposited mirror, or may be a dichroic mirror including a dielectric multi-layer film that reflects red light and transmits or absorbs light of colors other than red.

Next, operation of the liquid-crystal projector according to the present exemplary embodiment will be described.

The liquid-crystal projector according to the present exemplary embodiment also includes a control system having a configuration that is similar to the configuration illustrated in FIG. 5 but is different from that of the first exemplary embodiment in that blue light source 101B, green light source 101G and red light source 101R are placed in an on state in a time division manner.

Figure 9:
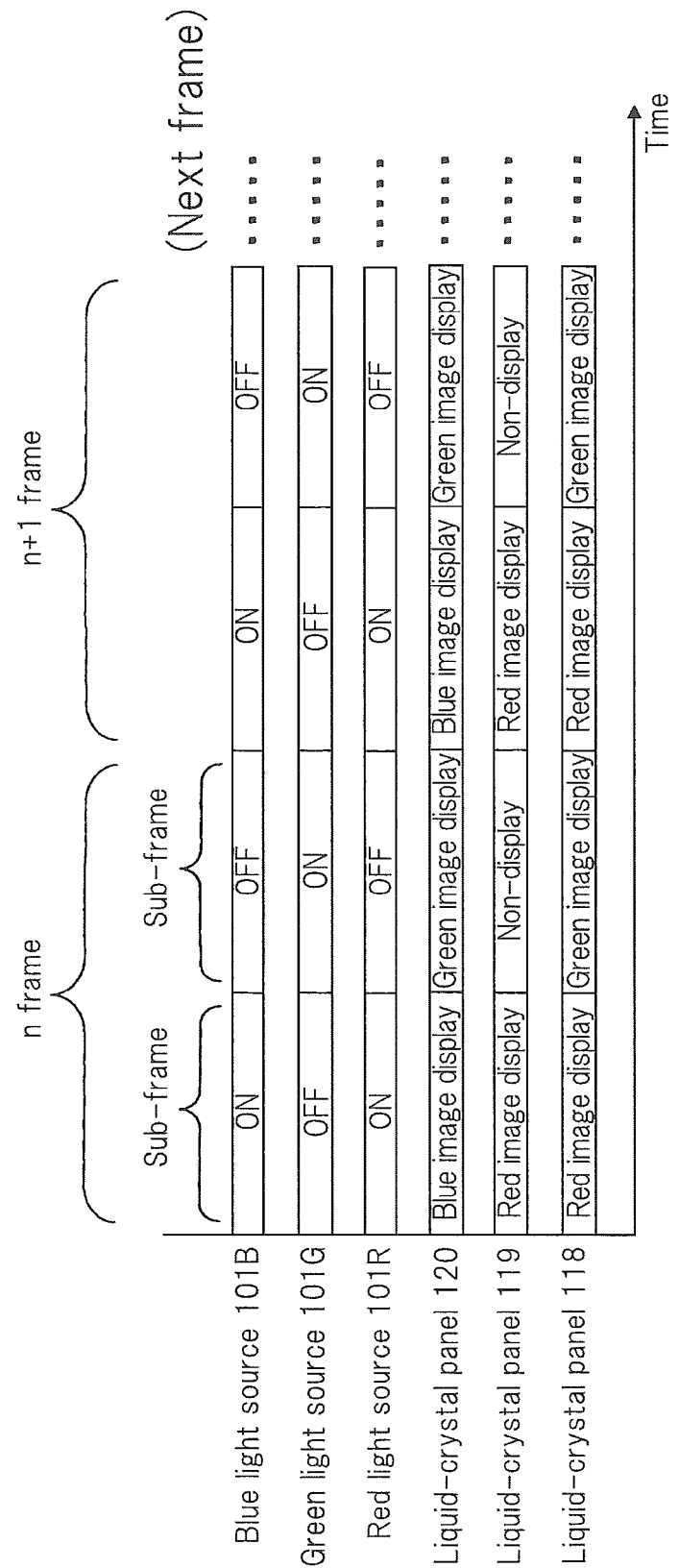
FIG. 9 is a timing chart for describing on/off operation of respective light sources and displaying operation of respective liquid-crystal panel sections in the liquid-crystal projector illustrated in FIG. 7.

FIG. 9 is a timing chart for describing on/off operation of blue light source 101B, green light source 101G and red light source 101R and for displaying operation of liquid-crystal panel sections 118 to 120.

Referring to FIG. 9, one frame includes a first sub-frame and a second sub-frame. In this example, the first sub-frame and the second sub-frame have the same length. For example, the frame frequency is 60 Hz and the sub-frame frequency is 120 Hz.

In the first sub-frame period in an n frame, light source driver 2 brings blue light source 101B and red light source 101R into an on state and brings green light source 101G into an off state. Then, liquid-crystal driver 3 causes an image based on a blue video signal obtained from an input video signal to be displayed on liquid-crystal panel section 120 and causes an image based on a red video signal obtained from the input video signal to be displayed on liquid-crystal panel sections 118 and 119. In this case, liquid-crystal panel sections 118 and 119 display a red image and liquid-crystal panel section 120 displays a blue image.

In the second sub-frame period in the n frame, light source driver 2 brings blue light source 101B and red light source 101R into an off state and brings green light source 101G into an on state. Then, liquid-crystal driver 3 causes an image based on a green video signal obtained from the input video signal to be displayed on each of liquid-crystal panel sections 118 and 120. In this case, liquid-crystal panel sections 118 and 120 each display a green image, but liquid-crystal panel section 119 provides no display.

In the operation illustrated in FIG. 9, in the first sub-frame period in the n frame, a blue image is displayed on liquid-crystal panel section 120 and a red image is displayed on liquid-crystal panel sections 118 and 119. In the following second sub-frame period, a green image is displayed on liquid-crystal panel sections 118 and 120. Accordingly, because of an integral effect of human eyes, an observer can observe a color image resulting from the blue and red images displayed in the first sub-frame period and the green image displayed in the second sub-frame period being combined, in the n frame.

In the liquid-crystal projector according to the present exemplary embodiment, as in the first exemplary embodiment, green light from green light source 101G is split into p-polarized light and s-polarized light by polarizing beam splitter 121, and the green s-polarized light is applied to liquid-crystal panel section 118. Green p-polarized light is combined with blue light (non-polarized light) from blue light source 101B by dichroic mirror 124, and the combined blue and green light is applied to liquid-crystal panel section 120 on the same optical path.

Also, red light from red light source 101R is split into p-polarized light and s-polarized light by polarizing beam splitter 122, and the red p-polarized light is applied to liquid-crystal panel section 119. The red s-polarized light is combined with green light from green light source 101G by cross dichroic mirror 123, and the combined red and green light is applied to liquid-crystal panel section 118 on the same optical path.

With the above configuration, the value of the light source-side etendue is not increased.

Also, as in the first exemplary embodiment, green s-polarized light from green light source 101G is applied to liquid-crystal panel section 118, and green p-polarized light from green light source 101G is applied to liquid-crystal panel section 120, and thus, almost no light loss of green light from green light source 101G occurs in liquid-crystal panel sections 118 and 120.

In addition, red s-polarized light from red light source 101R is applied to liquid-crystal panel section 118 and red p-polarized light from red light source 101R is applied to liquid-crystal panel section 119, and thus, almost no light loss of red light from red light source 101R occurs in liquid-crystal panel sections 118 and 119.

Maximum output values of red light source 101R and green light source 101G are smaller than that of blue light source 101B. Accordingly, the light utilitization efficiency of red light source 101R and green light source 1G, each having a maximum output value that is smaller than the value of blue light source 101B, is enhanced, thus enabling projection of an image that features excellent color reproducibility.

Other effects of the above are such as described in the first exemplary embodiment.

Also, in the present exemplary embodiment, changes described in the first exemplary embodiment can be made.

Another Exemplary Embodiment

In the above-described liquid-crystal projector according to the first or second exemplary embodiment, at least one light source from among red light source 101R, green light source 101G and blue light source 101B may be a light source using a phosphor.

FIG. 10 illustrates the configuration of a liquid-crystal projector according to another exemplary embodiment.

The liquid-crystal projector illustrated in FIG. 10 has a configuration that is the same as that of the first exemplary embodiment except for the provision of green light source 201G instead of green light source 101G. In FIG. 10, components that are the same as those of the first exemplary embodiment are provided with reference numerals that are the same as those of the first exemplary embodiment, and a detailed description thereof will be omitted here.

FIG. 11 illustrates phosphor wheel 302, and FIG. 12 illustrates a configuration of green light source 201G including phosphor wheel 302.

As illustrated in FIGS. 11 and 12, phosphor wheel 302 includes a disc-like substrate, and a surface of the substrate is coated with a phosphor that emits green fluorescence upon being excited by excitation light. The substrate includes a material that transmits excitation light.

A central portion of phosphor wheel 302 is held by the output shaft of motor 303, enabling phosphor wheel 302 to be rotated by motor 303.

On the side of phosphor wheel 302 opposite to the surface coated with the phosphor, excitation light source 301 is arranged. When excitation light source 301 is activated on while phosphor wheel 302 is being rotated, green fluorescence is emitted from the phosphor surface of phosphor wheel 302.

The present exemplary embodiment also provides effects similar to those of the first exemplary embodiment.

What is claimed is:

1. A liquid-crystal projector comprising:
   first to third liquid-crystal panel sections that each spatially modulate incident light to display an image;
   a first illumination section that includes a red light source that emits red light having a peak wavelength in a red wavelength band, the red light emitted from the red light source being applied to said first liquid-crystal panel section;
   a second illumination section that includes a green light source that emits green light having a peak wavelength in a green wavelength band and a blue light source that emits blue light having a peak wavelength in a blue wavelength band, the green light emitted from the green light source being split into first linearly-polarized light and second linearly-polarized light, vibration directions of the first linearly-polarized light and the second linearly-polarized light being perpendicular to each other, the first linearly-polarized light being applied to said second liquid-crystal panel section, the second linearly-polarized light and the blue light emitted from the blue light source being applied to said third liquid-crystal panel section;
   a polarized light color combining section that combines images displayed on said first to third liquid-crystal panel sections;
   a projection lens that projects combined image light resulting from the combination in said polarized light color combining section; and
   a control unit that controls on/off states of the red light source, the green light source and the blue light source based on an input video signal to display respective images on said first to third liquid-crystal panel sections.

2. A liquid-crystal projector comprising:
   a red light source that emits red light having a peak wavelength in a red wavelength band;
   a green light source that emits green light having a peak wavelength in a green wavelength band;
   a blue light source that emits blue light having a peak wavelength in a blue wavelength band;
   a first polarizing/splitting section that splits the red light emitted from said red light source into first linearly-polarized light and second linearly-polarized light, vibration directions of the first linearly-polarized light and the second linearly-polarized light being perpendicular to each other;
   a second polarizing/splitting section that splits the green light emitted from said green light source into the first linearly-polarized light and the second linearly-polarized light;
   a first color combining section that receives the first linearly-polarized light of the red light and the first linearly-polarized light of the green light as incident light, and outputs the incident red light and the incident green light on a same optical path;
   a second color combining section that receives the second linearly-polarized light of the green light and the blue light output from said blue light source as incident light, and outputs the incident green light and the incident blue light on a same optical path;
   a first liquid-crystal panel section that spatially modulates the second linearly-polarized light of the red light to display an image;
   a second liquid-crystal panel section that spatially modulates the red light and the green light that exit from the first color combining section to display an image;
   a third liquid-crystal panel section that spatially modulates the green light and the blue light that exit from said second color combining section to display an image;
   a polarized light color combining section that combines the images displayed on said first to third liquid-crystal panel sections;
   a projection lens that projects combined image light resulting from the combination in said polarized light color combining section; and
   a control unit that controls on/off states of said red light source, said green light source and said blue light source based on an input video signal to display respective images on said first to third liquid-crystal panel sections.

3. The liquid-crystal projector according to claim 1,
   wherein said first to third liquid-crystal panel sections each supply an image according to the first or second linearly-polarized light; and
   wherein said polarized light color combining section includes:
   an exit surface;
   a first incident surface to which the red light that exits from said first liquid-crystal panel section is applied;
   a second incident surface to which the second linearly-polarized light of the green light that exits from said second liquid-crystal panel section is applied;
   a third incident surface to which the blue light and the first linearly-polarized light of the green light that exit from said third liquid-crystal panel section are applied;
   a first reflective surface that reflects the red light that entered from the first incident surface to cause the red light to exit from the exit surface, transmits the second linearly-polarized light of the green light that entered from the second incident surface to cause the second linearly-polarized light of the green light to exit from the exit surface, and transmits the blue light and the first linearly-polarized light of the green light that entered from the third incident surface to cause the blue light and the first linearly-polarized light of the green light to exit from the exit surface; and a second reflective surface that reflects the blue light and the first linearly-polarized light of the green light that entered from the third incident surface to cause the blue light and the first linearly-polarized light of the green light to exit from the exit surface, transmits the second linearly-polarized light of the green light that entered from the second incident surface to cause the second linearly-polarized light of the green light to exit from the exit surface and transmits the red light that entered from the first incident surface to cause the red light to exit from the exit surface.

4. The liquid-crystal projector according to claim 1, wherein said control unit activates the red light source to display a red image on said first liquid-crystal panel section in a predetermined period, and activates the blue light source to display a blue image on said third liquid-crystal panel section in a first period and activates the green light source to display a green image on each of said second and third liquid-crystal panel sections in a second period, the predetermined period being divided into the first and second periods at a predetermined ratio.

5. The liquid-crystal projector according to claim 2, wherein said control unit activates said blue light source to display a blue image on said third liquid-crystal panel section and activates said red light source to display a red image on each of said first and second liquid-crystal panel sections in a first period, and activates said green light source to display a green image on each of said second and third liquid-crystal panel sections in a second period.

6. The liquid-crystal projector according to claim 1, wherein at least one light source from among the red light source, the green light source and the blue light source includes an excitation light source that emits excitation light and a phosphor that, upon being excited by the excitation light, emits fluorescence.

7. The liquid-crystal projector according to claim 2, wherein said first to third liquid-crystal panel sections each supply an image according to the first or second linearly-polarized light; and wherein said polarized light color combining section includes:

an exit surface;

a first incident surface to which the first linearly-polarized light of the red light that exits from said first liquid-crystal panel section is applied;

a second incident surface to which the second linearly-polarized light of the red and green light that exit from said second liquid-crystal panel section is applied;

a third incident surface to which the blue light and the first linearly-polarized light of the green light that exit from said third liquid-crystal panel section are applied;

a first reflective surface that reflects the first linearly-polarized light of the red light that entered from the first incident surface to cause the first linearly-polarized light of the red light to exit from the exit surface, transmits the second linearly-polarized light of the red and green light that entered from the second incident surface to cause the second linearly-polarized light of the red and green to exit from the exit surface, and transmits the blue light and the first linearly-polarized light of the green light that entered from the third incident surface to cause the blue light and the first linearly-polarized light of the green light to exit from the exit surface; and a second reflective surface that reflects the blue light and the first linearly-polarized light of the green light that entered from the third incident surface to cause the blue light and the first linearly-polarized light of the green light to exit from the exit surface, transmits the second linearly-polarized light of the red and green light that entered from the second incident surface to cause the second linearly-polarized light of the red and green light to exit from the exit surface, transmits the first linearly-polarized light of the red light that entered from the first incident surface to cause the first linearly-polarized light of the red light to exit from the exit surface.

8. The liquid-crystal projector according to claim 2, wherein at least one light source from among the red light source, the green light source and the blue light source includes an excitation light source that emits excitation light and a phosphor that, upon being excited by the excitation light, emits fluorescence.

* * * * *